United States Patent [19]

DeClark et al.

[11] Patent Number: 4,470,292
[45] Date of Patent: Sep. 11, 1984

[54] SHOT PEENING INTENSITY DETECTOR

[75] Inventors: Bruce W. DeClark, Walker, Mich.; Joseph F. Loersch, Bolton; James W. Neal, Columbia, both of Conn.; Joseph H. Weber, Grand Rapids, Mich.

[73] Assignee: United Technologies Corporation, Hartford, Conn.

[21] Appl. No.: 300,724

[22] Filed: Sep. 10, 1981

[51] Int. Cl.³ .............................................. G01L 5/00
[52] U.S. Cl. ........................................ 73/11; 73/12; 73/861.73; 73/861.75
[58] Field of Search ............ 73/11, 12, 432 R, 861.73, 73/861.75

[56] References Cited

U.S. PATENT DOCUMENTS

| 2,316,255 | 4/1943 | Knoble et al. | 73/861.75 |
| 2,607,213 | 8/1952 | Barton | 73/12 |
| 3,212,330 | 10/1965 | De Pollier | 73/861.73 |
| 3,304,773 | 2/1967 | Rogallo | 73/12 |
| 4,067,238 | 1/1978 | Oetiker | 73/861.73 |

Primary Examiner—S. Clement Swisher
Attorney, Agent, or Firm—C. G. Nessler

[57] ABSTRACT

In shot peening apparatus, a device is provided for sensing shot peening intensity and the uniformity of shot flow. It is basically comprised of a detector plate mounted on a cantilevered arm; torque created at the arm mounting due to the impact of shot is measured with a transducer. The detector is mounted on a structure adapted to translate the detector through a large shot peening zone. The invention is especially suited for assuring consistency in a process wherein uniform spherical shot is gravity accelerated to impact a workpiece with uniform velocity.

11 Claims, 3 Drawing Figures

SHOT PEENING INTENSITY DETECTOR

DESCRIPTION

Background Art

The present invention relates to shot peening, particularly to the measurement of the intensity of peening which a particular stream of shot will provide.

The present invention is related to application Ser. No. 300,725 "Method for Simultaneous Peening and Smoothing", filed on Sept. 10, 1981, by inventors partially in common herewith, and the disclosure thereof is incorporated by reference. In the related application, a method for shot peening comprises the impacting of workpieces with uniformly sized spherical steel shot accelerated by force of gravity towards a workpiece. In the best embodiment of the invention the shot falls from an overhead gate, such as a perforated plate, through an enclosure and strikes the workpiece. The gate is configured to uniformly distribute the shot throughout the work zone where multiple workpieces may be positioned. By its nature, the improved method is particularly suited to providing uniform compressive stresses of a relatively low intensity, in combination with substantially improved surface finishes.

One of the primary purposes of shot peening is to provide residual compressive stresses which improve the fatigue resistance of workpieces. Thus, to ensure uniformity of the product produced by the shot peening process, it is important that there be means for checking the shot peening intensity before or during the shot peening process. Heretofore, the primary method of measuring and checking shot peening intensity has been through the use of the Almen strip. In this procedure as described in specifications J442 and AMS 2430H (Society of Automotive Engineers), a thin strip of steel is held firmly in a holder and subjected to the peening operation. Upon removal from the holder, the strip takes on a curved shape, owing to the residual compressive stresses in the side exposed to peening. Measurement of the height of curvature gives a measure of the peening intensity.

As may be evident, when there are multiple workpiece stations within a shot peening apparatus to be checked, or when frequent checks of peening intensity are desired, the use of Almen strips can be rather tedious. Consequently, there has been a need for an improved procedure.

SUMMARY OF THE INVENTION

An object of the invention is to provide a reliable means for quickly and continuously monitoring the peening intensity in a shot peening system.

In accord with the invention, the relative shot peening intensity and uniformity are measured by sensing the momentum transferred from the shot to a plate immersed in the shot stream, and mounted on a structural support. In the preferred configuration of the invention, a plate of hardened steel connected to a cantilevered arm is interposed into the shot stream. The force of the shot on the plate causes bending moment in the arm or its support which is measured by means of transducer, such as a load cell or strain gage.

In a particular embodiment of the invention suited for use in a production apparatus having a multiplicity of workpiece stations and a relatively large peening area, the detector arm is cantilevered from a torsion rod mounted in a carriage adapted to move in a first planar direction. The carriage is mounted on a frame which is adapted to move in a second planar direction, 90° to the first direction. Thus by manipulation of drivers which move the carriage and frame, the detector plate can be made to scan the shot peening work zone. A continuous readout may be provided which shows the consistency of shot peening.

Experiment has indicated that the detector will reliably show different peening intensities (a function of the size of the shot and the velocity at which it impacts the workpiece) as well as the mass flow rate of shot at any given location.

BEST MODE FOR CARRYING OUT THE INVENTION

Figure 1:
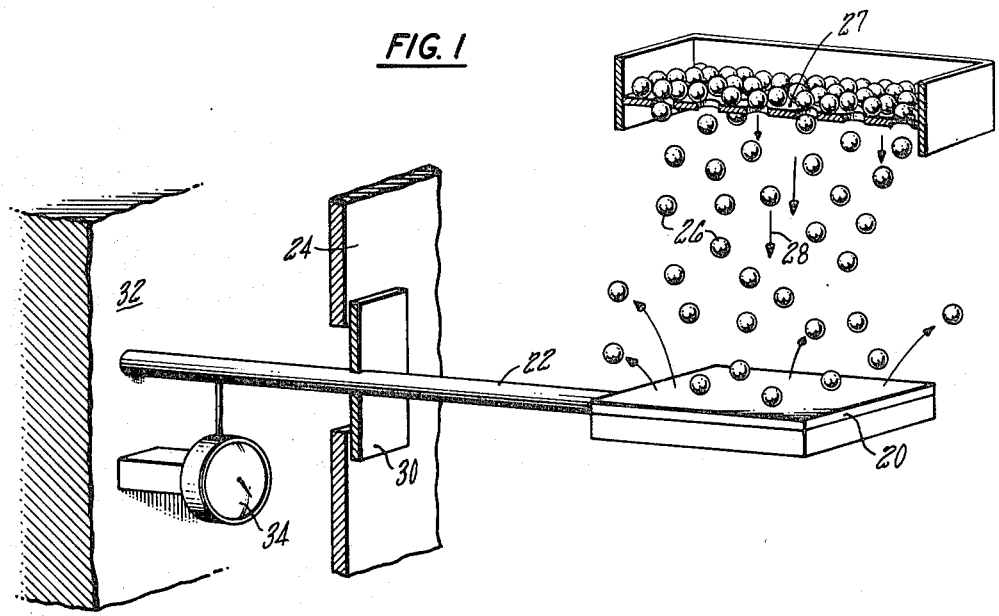
FIG. 1 is a basic embodiment of the invention showing a detector plate immersed in a shot stream.

The basic principle of the invention is illustrated by the simplified apparatus shown in FIG. 1. A hardened steel plate 20 is rigidly fixed to a steel arm 22 cantilevered from a solid structure 32. The plate is positioned inside an enclosure 24 so that shot 26 falls along a streamline 28 from a discharge grate 27, and impacts it. The plate hardness is such that when the shot impacts it, the collision is elastic. The shot therefore rebounds, and with interaction with the other shot particles eventually moves to the side and passes by the plate. A shield 30 is affixed to the shaft in proximity to the wall of the enclosure 24, to prevent the escape of shot. However, the shield movement is not restricted by contact with the wall, so the arm can deflect without encumberance. When shot hits the plate 20 on a continuous basis, there is an average steady state force which is transferred to the plate by virtue of the shot momentum. This impulse causes deflection of the arm which can be measured by the gage 34, affixed to the rigid base 32.

Figure 2:
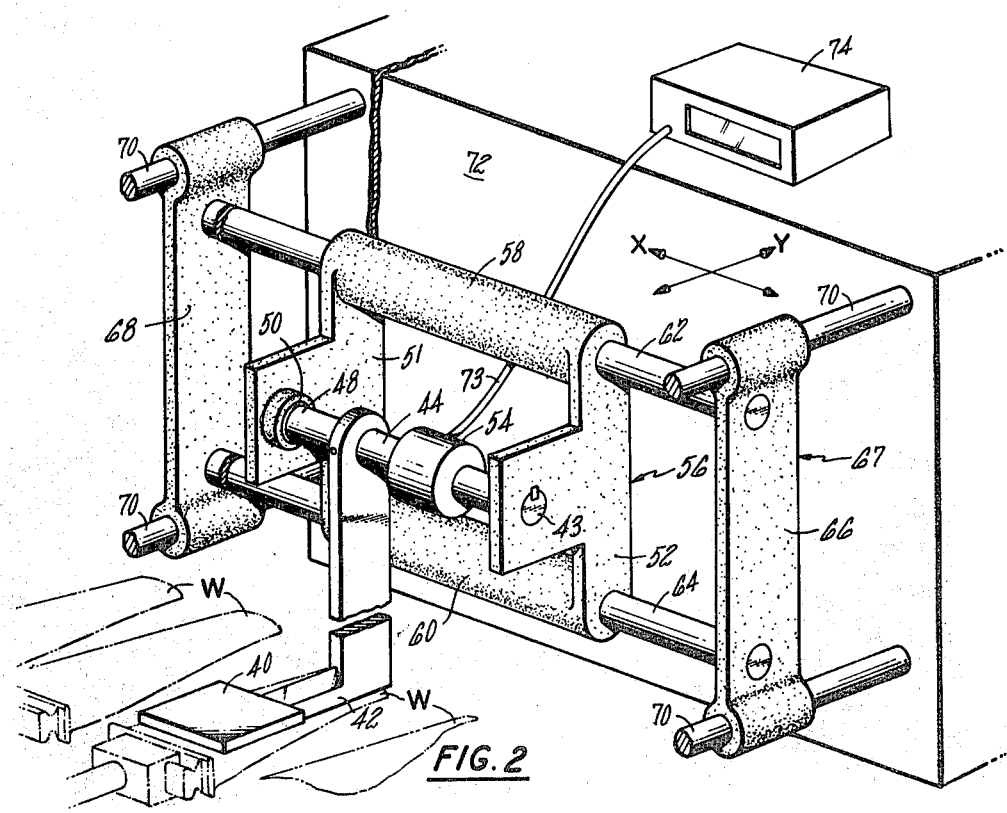
FIG. 2 shows a detector system which is adapted for traversal of a large shot peening work zone, and which provides continuous readings.

FIG. 2 shows a more refined embodiment of the invention which is suited for use in the apparatus disclosed in copending application Ser. No. 300,725 "Shot Peening Apparatus" filed on Sept. 10, 1981, and having some common inventors with the instant application. The disclosure thereof is hereby incorporated by reference.

According to the referenced application, shot is dropped by gravity from a perforated plate mounted above the workpiece holding zone. Since a multiplicity of workpieces W may be placed in the workpiece holding zone, it is important that uniform results be produced on all the workpieces. This is especially important in the improved peening process mentioned in the background, since the peening parameters are relatively critical in obtaining the desired superior results.

The apparatus shown in FIG. 2 is adapted to translate in the x and y lateral directions within a shot peening enclosure. Thus, it is suited to monitor the uniformity of shot fall from point to point within a large shot stream pattern.

Referring to FIG. 2, the detector plate 40 is mounted on the end of a bent arm 42. The arm is fixedly mounted to shaft 44 which is mounted in carriage 56. The shaft is fixedly mounted in carriage strut 52 at one end 43, and rotatably mounted at the other end 48, by means of the bearing 50 mounted on carriage strut 51. Thus, when there is a downward force on the plate 40, there will be a tendency to torsionally rotate the shaft 44. The torsional movement will be resisted by the strut 52 of carriage 56, in which the shaft is fixed. The shaft 44 has, mounted thereon between the fixed end 43 and the arm 42, a shaft reaction torque sensor 54, of the strain gage type, such as a Model No. 2121-100 sensor sold by Lebow Associates, Inc., Troy, Mich. The sensor provides an output signal, proportional to the rotational deflection which the shaft 44 is elastically subjected to, through electric conductors 73, to the power supply and readout device 74. As will be seen below, this signal is a measure of the parameters of the shot stream. The arm is L-shaped to enable the moveable parts and the torque transducer to be located at a protected location where they will be less prone to impact by shot moving laterally after having hit the detector. The arm also has a low projected area in the plane transverse to the shot stream, and a tapered (triangular) cross section at its top, to minimize the transfer of shot momentum to the arm, compared to the plate.

The carriage 56 is adapted to move linearly in the x direction along parallel shafts 62,64 by virtue of the linear bearing portions 58, 60, which are connected by struts 51, 52. The shafts 62, 64 are mounted fixedly in end plates 66, 68 and comprise together a frame 67. In analogous matter to that described for the carriage 56, bearings in the end plates 66, 68 enable the frame 67 to move linearly in the y direction, along the four parallel shafts 70. The shafts 70 are fixedly mounted in a structure 72 which is part of, or attached to, the shot peening enclosure where the measurements are to be taken.

Actuators, such as linear motors, ball screws, or cylinders may be used to impart motion to the primary moveable members, carriage 56 and frame 67. They are omitted from the drawings for the sake of clarity of illustration but it will be evident to those of ordinary skill that there are numerous ways in which the motion may be easily provided.

The torque sensor 54 is connected to a strain gage conditioner 74, such as a Daytronic Model 3270 strain gage conditioner/indicator (Daytronic Corp., Dayton, Ohio). A bridge excitation is supplied through conductors 73, thus enabling a numerical output indication which is proportional to the degree of rotation, and thus the torque applied to the shaft 44. All of this is in a conventional mode, familiar to those with skill in the art of force measurement.

Figure 3:
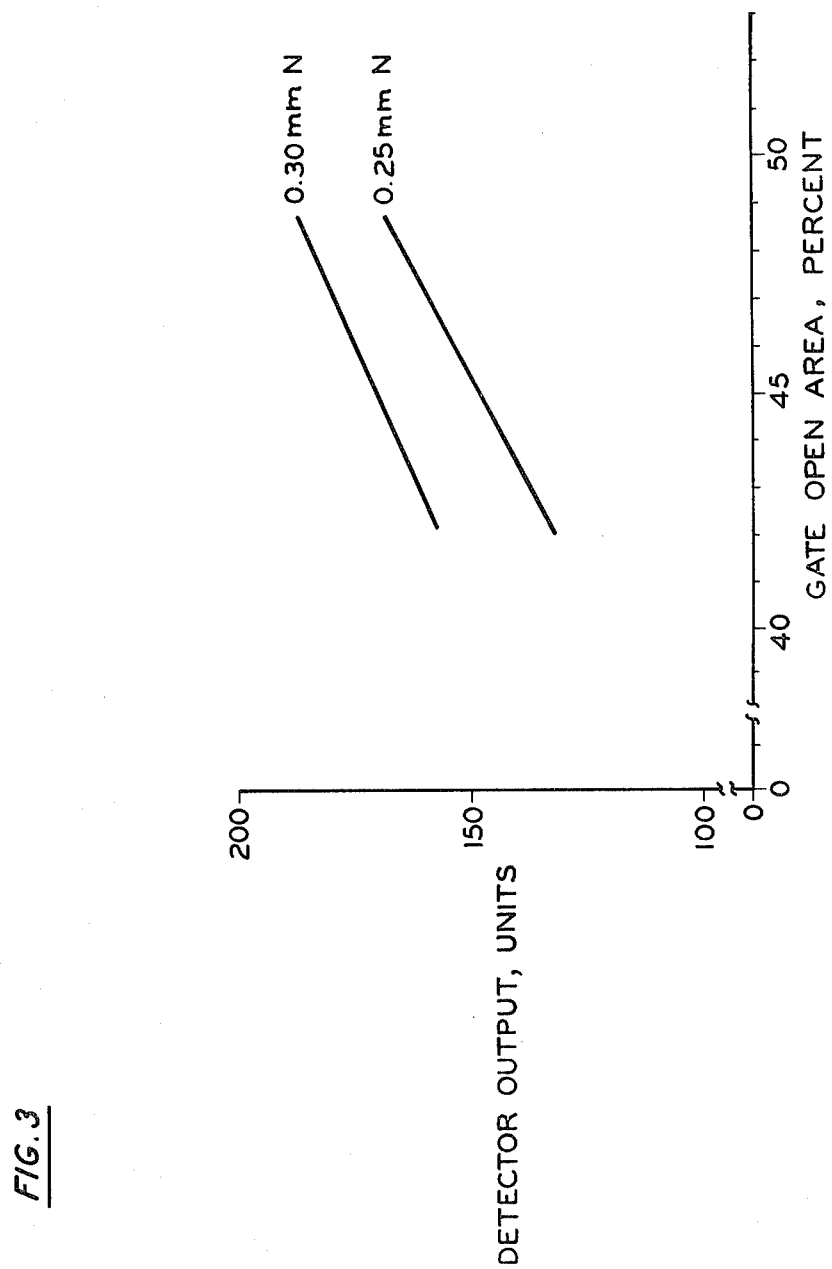
FIG. 3 show the output readings of a detector system for different peening conditions.

Experimental tests have been run using a perforated plate, 1.8 mm diameter steel shot, and different gravity drop heights. FIG. 3 shows some data which was obtained. Two different peening intensities were utilized (reflective of two different drop heights), namely 0.25 and 0.30 mm N, according to the Almen test strip method and Society of Automotive Engineers Specification AMS 2430. The perforated plate had an open area of 49%, that is the perforations amounted to 49% of the total area of the plate. Portions of the area were blocked while the shot fell from a 100 mm diameter perforated plate onto a 100 mm diameter detector plate mounted about 0.65 meters below it. It is seen from the Figure that the reading of the sensor output is proportional to the percentage of open area. Further, it is seen that, for any given percentage open area, the output of the sensor is proportionate to the peening intensity.

Accordingly, the invention can be used both to monitor the peening intensity, and the uniformity of shot from one region to another. The reading which is obtained is virtually instantaneous. There is no degradation in the detector plate, and therefore the obtaining of readings may be done continuously. Referring to the apparatus shown in FIG. 2, when the driver motors are suitably programmed, and a strip chart recorder is coupled to the output of the sensor, a continuous reading may be obtained of the peening intensity at different locations within a work zone, or the consistency of peening from one day to the next may be readily obtained. Of course, the detector can be easily calibrated by providing a standard force to the plate, before it is used for peening.

Other configurations of the apparatus are within contemplation. The size and shape of the detector plate is somewhat arbitrary, depending on the area to be checked. However, a plate that is too small will not be operable as it will not receive a good steady state force, but a series of sequential flows. Generally, for use in a uniform shot stream, the plate should have an area which is at least 25 times the cross-sectional area of the spherical shot particles which is to impact it.

As indicated, it is best that the detector surface should not be plastically deformed by the shot, to obtain rapid and consistent readings. However, in special circumstances it may be appropriate to have the plate surfaced with a material having the same properties of the workpiece to be processed. Similarly, the flat plate appears best although other non-planar shapes will work. The section size properties of the arm, shaft, or other structural support having its delection being measured may be varied, according to the shot size and detector plate size, to obtain the best sensitivity. Further, while a cantilevered support arm is preferred, because of the relatively easily detectable bending moment, other types of beams subject to deflection may be used as well. And, of course other means for sensing the bending moment in the arm may be utilized, including simple strain gages, optical position sensors, etc. While sensing the bending deflection in the arm or its support is simplest, it is also within contemplation that other means to record the average force on the detector plate may be used, including such as multiple pressure sensitive cells mounted on the plate together with means for counting and summing the intensity and number of individual blows.

Although this invention has been shown and described with respect to a preferred embodiment, it will be understood by those skilled in the art that various changes in form and detail thereof may be made without departing from the spirit and scope of the claimed invention.

We claim:

1. A device for measuring the intensity and uniformity of shot moving along shot stream line, characterized by:
    a plate, for interposition into the shot stream line to receive impacts from the moving shot;
    a structural support attached to the plate, the support cantilevered off a movable carriage, for holding the plate in the shot stream;
    means for sensing deflection of the structural support caused by shot impacting on the plate; and
    a movable carriage for causing translation of the support and plate, to move the plate in a plane transverse to the direction of the shot stream line.

2. The device of claim 1 further characterized by a structural support which is comprised of a cantilevered arm rotatably fixed to a shaft; the shaft mounted so that shot impact force on the plate which is resisted by the arm results in elastic torsional deflection of the shaft; and, means for sensing the torsional deflection of the shaft.

3. The device of claim 1 further characterized by a movable assembly comprised of a carriage movably mounted on a frame, the carriage adapted to move in a first axial direction relative to the frame; and, the frame adapted to move in a second axial direction; said first and second directions enabling the plate to be translated within the plane transverse to the shot streamline.

4. The device of claim 2 characterized by an arm which is L-shaped, to position the shaft and means for sensing torsional deflection thereof upstream from the detector plate.

5. The device of claim 1 wherein the plate has an area at least 25 times the cross sectional area of the shot particles being measured.

6. Apparatus for peening one or more workpieces, wherein a shot stream pattern is produced in a workpiece holding zone, characterized by a peening intensity detector comprised of a plate, to receive shot impacts; means for continuously sensing the shot impacts on the plate; and, means for traversing the detector plate through the shot stream pattern in the workpiece holding zone.

7. The apparatus of claim 7 further characterized by the workpiece holding zone contained in an enclosure, the detector plate cantilevered from an arm projecting into the workpiece holding zone, and the arm attached to an assembly of movable members mounted external to the enclosure.

8. The apparatus of claim 8 further characterized by an L-shaped arm and by means for sensing shot impacts comprised of a transducer providing a signal in response to the bending moment created in the arm.

9. In apparatus for treating a workpiece held in a workpiece holding zone located along the transverse length of shot stream line, said workpiece being immovable in a direction along said length of said shot stream line along which moves a plurality of shot directed to impinge the surfaces of said workpiece comprising, a device for continuously measuring the intensity and uniformity of the shot moving along said length of said shot stream, said device including impact sensing means interposed into the shot stream line to receive impacts from the moving shot; said sensing means providing an output signal proportional to the impacting of the shot and means for translating said impact sensing means along said length of said shot stream line for measuring the impact intensity and uniformity of the shot along said length of said shot stream line.

10. The device of claim 9 in which the impact sensing means is a plate interposed into the shot stream line to receive impacts from the moving shot; a structural support attached to the plate, for holding the plate in the shot stream: and means for sensing deflection of the structural support caused by shot impacting on the plate.

11. The device of claim 9 further characterized by said sensing means being mounted on a cantilevered member: a movable assembly supporting said cantilevered member: and means for translating the assembly along the said length of said shot stream line whereby said impact sensing is translated on a plane transverse to the direction of the shot stream along the said length thereof.

* * * * *

UNITED STATES PATENT AND TRADEMARK OFFICE
CERTIFICATE OF CORRECTION

PATENT NO. : 4,470,292

DATED : September 11, 1984

INVENTOR(S) : Bruce W. DeClark et al

It is certified that error appears in the above-identified patent and that said Letters Patent is hereby corrected as shown below:

Column 5, claim 7, line 1, "7" should be "6"

Column 6, claim 8, line 1, "8" should be "7"

Signed and Sealed this

Twenty-first Day of May 1985

[SEAL]

Attest:

DONALD J. QUIGG

Attesting Officer

Acting Commissioner of Patents and Trademarks